United States Patent [19]
Gessler

[11] 3,737,054
[45] June 5, 1973

[54] ROTOR ARM FOR SILO DISCHARGING DEVICES

[75] Inventor: Hans Gessler, Aalen/Wurttemberg, Germany

[73] Assignee: Schwabische Huttenwerke Gesellschaft mit beschrankter Haftung, Wasseralfingen/Wurttemberg, Germany

[22] Filed: June 8, 1971

[21] Appl. No.: 151,112

[30] Foreign Application Priority Data

June 12, 1970 Germany.................P 20 28 901.4
Feb. 4, 1971 Germany.................P 21 05 134.3

[52] U.S. Cl....................214/17 D, 222/228, 267/53
[51] Int. Cl..................................................B65g 65/48
[58] Field of Search....................214/17 D, 17 DA; 222/228; 267/53; 198/212

[56] References Cited

UNITED STATES PATENTS

| | | | |
|---|---|---|---|
| 1,232,443 | 7/1917 | Turner | 267/53 |
| 1,114,312 | 10/1914 | Tomasini | 267/53 |

FOREIGN PATENTS OR APPLICATIONS

| | | | |
|---|---|---|---|
| 1,801,504 | 5/1970 | Germany | 214/17 D |
| 617,208 | 2/1949 | Great Britain | 267/53 |

Primary Examiner—Robert G. Sheridan
Attorney—Walter Becker

[57] ABSTRACT

A rotor arm for silo discharging devices which is formed by a leaf spring packet the leaf springs of which are slidably engaging each other and are held together by holding means while a damping device engaging the rotor arm is provided for damping the relaxing movement of the rotor arm in the direction in which the rotor arm rotates during its working operation.

28 Claims, 7 Drawing Figures

PATENTED JUN 5 1973
3,737,054
SHEET 1 OF 2
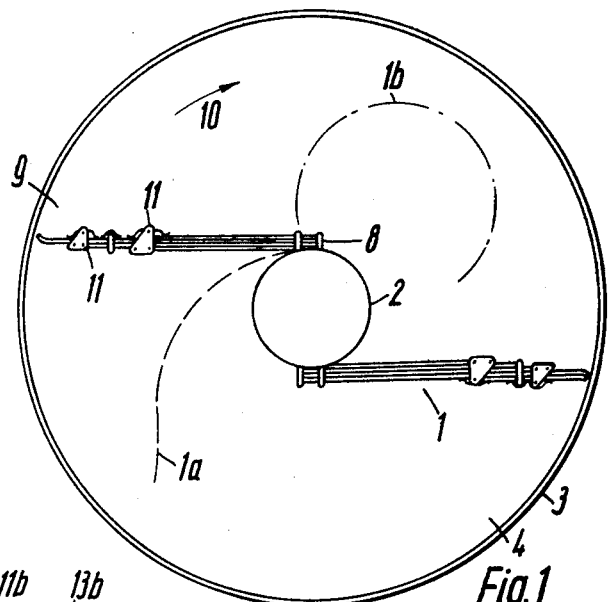
Fig.1
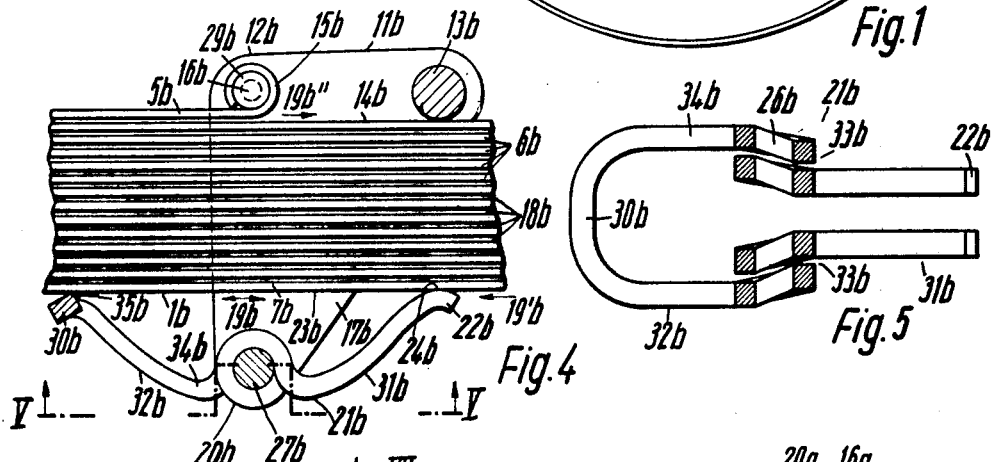
Fig.4
Fig.5
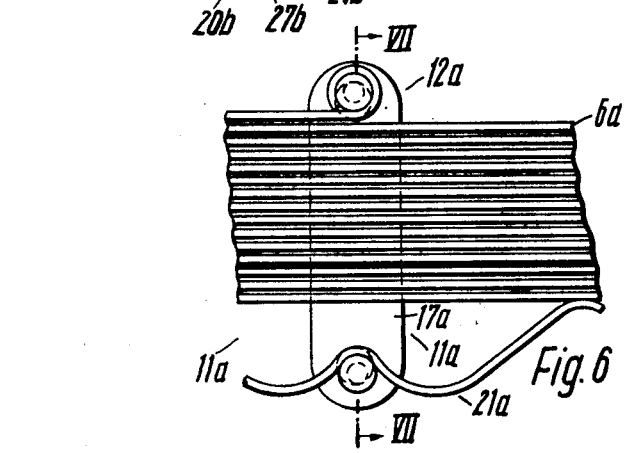
Fig.6
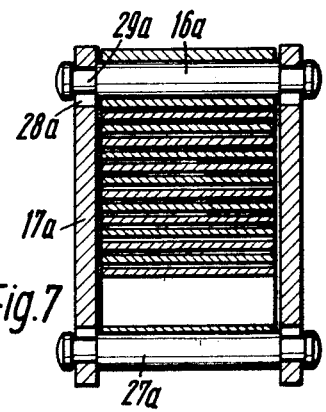
Fig.7
Inventor:
Hans Gessler
By Walter Becker

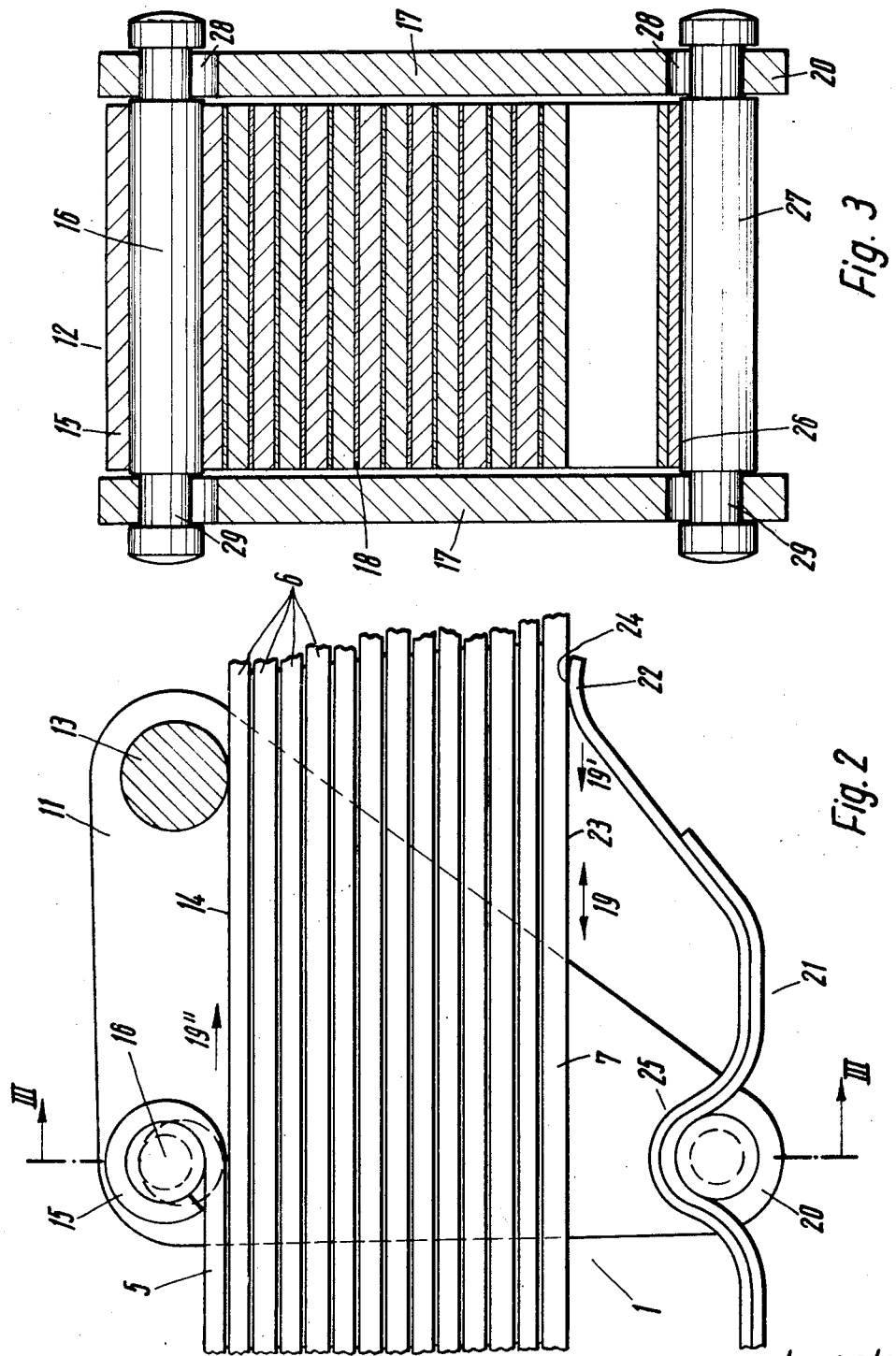

ROTOR ARM FOR SILO DISCHARGING DEVICES

The present invention concerns a rotor arm for silo discharging devices with a leaf spring packet the spring leaves of which are held together by holding means while permitting a sliding movement of the spring leaves in the longitudinal direction thereof.

When operating silo discharging devices, it has been found that in instances in which, in view of a special way of operating the device, frequently hollow spaces will form in the lower portion of the column of pourable goods in the silo or when the silo is frequently emptied, the rotor arms relax from their operational position in which they are loaded counter to working direction of rotation and spring forwardly so that the arms due to the suddenly released power, so to speak, will whip beyond the relaxed or unloaded position. As a result thereof, peak loads can occur in the rotor arms which may bring about an overexpansion of the leaf springs.

It is, therefore, an object of the present invention to provide a rotor arm of the above mentioned type which will overcome the above outlined drawbacks.

This object and other objects and advantages of the invention will appear more clearly from the following specification in connection with the accompanying drawings, in which:

FIG. 1 is a diagrammatic top view of a rotor provided with rotor arms according to the invention.

FIG. 2 is a cutout of the rotor arm according to FIG. 1 but on a larger scale than the latter.

FIG. 3 represents a section taken along the line III — III of FIG. 2.

FIG. 4 is another cutout of the rotor arm of FIG. 1 but on a larger scale than the latter.

FIG. 5 is a section taken along the line V — V of FIG. 4.

FIG. 6 illustrates a further embodiment of the invention shown in a way similar to that of FIG. 4.

FIG. 7 is a section taken along the line VII — VII of FIG. 6.

The rotor arm for silo discharging devices according to the present invention which has leaf springs held together and slidable relative to each other in their longitudinal direction is characterized primarily in that damping means engaging the rotor arm are provided for damping or cushioning the relaxing movement in the working direction.

The damping means may be linked, for instance, to the rotor arm in such a way that it will be effective over the entire relaxing stroke. According to a particularly simple embodiment of the invention, the rotor arm carries the damping means while the damping means is preferably at least partially formed by a holding device.

In order, particularly when employing a friction damping device, to make sure that this damping device will be effective only during the relaxing stroke of the rotor arm and not during the loading stroke, it is suggested according to a further development of the invention that the damping device can from its damping position be moved into a position of a lesser damping effect and in particular comprises a feeler element for transferring the damping device into at least one, preferably both positions, said feeler element being influenced by the movement of the rotor arm, preferably the longitudinal movement of the spring leaves relative to each other. The damping device may, however, also be spring-urged toward one position.

With the design according to the present invention, special brake elements absorbing the damping friction may be omitted when the damping device has a clamping element for compressing at least two, preferably all of the spring leaves within its range so that by compressing the spring leaves to a greater or lesser extent a correspondingly strong damping will be realized.

Expediently, the clamping spring forms a coiled torsion spring. This brings about a flatter spring diagram than the employment of a spring yoke, which fact is in certain instances of great advantage.

Expediently, the clamping spring has a rectangular cross section while in the coiled or wound range preferably the longer cross-sectional edge is parallel to the coiling or winding axis so that a high elasticity is obtained.

According to a further development of the invention, the clamping spring has one bearing opening which is formed by a wound section and is intended for receiving a bolt. According to a particularly advantageous embodiment of the invention, two wound sections, preferably arranged in spaced relationship adjacent to each other are provided as merging area between the legs of the yoke and the wire ends of the clamping spring so that the clamping spring will over its entire width be safely mounted on the bolt.

According to the present invention, especially with a rotor arm of the above described type, it is suggested that a holding member which carries the clamping spring is by means of a bolt or the like pivotally linked to the spring leaf packet and is adapted to be pivoted from its starting position in both pivoting directions. In this way the damping action is effective in both bending directions of the rotor arm which fact is advantageous particularly for short less loaded spring arms.

This design also makes it possible to mount the holding means in the manner of a one-arm lever in the end range of which the clamping spring is journalled.

According to a particularly simple embodiment of the invention, the holding means is formed by two flat bars laterally located on the leaf spring packet. These flat bars are preferably at their ends provided with a bore for the detachable mounting of the bolts.

Referring now to the drawings in detail, FIG. 1 shows rotor arms 1 which are tangentially connected to the circumference of a cylindrical drum-shaped rotor 2. Rotor 2 is journalled in the vertical central axis of a, for instance, cylindrical silo 3, immediately above the bottom 4 of said silo.

In conformity with FIGS. 1 to 3, the rotor arms 1 are formed by a plurality of spring leaves 5 to 7 arranged adjacent to each other. The inner ends of the spring leaves 5 to 7 engage each other at the inner end 8 of the rotor arm 1 and in the direction toward the free end 9 of the spring or rotor arm have stepped lengths so that the spring packet cross section of the rotor arm 1 decreases in the direction toward the free end 9. The respective shorter spring leaves are located in the rotary working direction (indicated by the arrow 10) of the rotor 2 behind the respective longer spring leaves. The spring leaves 5 to 7 are held together by holding members 11, a plurality of said holding members being provided in the longitudinal direction of each rotor arm 1 and being spaced from each other.

When the rotor 2 turns in the rotary working direction indicated by the arrow 10, the rotor arms 1 are by the resistance formed by the respective material in the silo resiliently pressed back counter to the rotary working direction into the dash line position relative to the rotor 2. As soon as the rotor arm 1 does no longer encounter any resistance, for instance when the silo is empty or when hollow spaces are present in the respective material in the silo, the rotor arm 1 will relax and spring back into the position shown in FIG. 1. The force of the returning movement may be of such a magnitude that the rotor arm 1 will jump beyond its relaxed normal position into the position shown in dot-dash lines 1b. The result of such a situation may be an overexpansion of the spring leaves.

In order to avoid this effect, at least one holding member 11 is designed as damping device according to FIGS. 2 and 3. The damping device 11 comprises a U-shaped support 12 the legs of which, that are located laterally on the spring leaves and opposite to each other, are formed by two plates 17 having the shape of a right-angled triangle with rounded corners and the transverse web of which is formed by a cylindrical bolt 13 rigidly connecting the plates 17 to each other. The bolt 13 is in the unequal-sided triangular plates 17 located within the region of the corners which define an angle α of approximately 50°. Within the region of the two other corners of the plates 17 there is provided an additional bolt 16 and 27 respectively while the bolt 16 in the region of the right-angled corners of plates 17 is in the longitudinal direction of the rotor arm 1 located opposite the bolt 13. The bolt 27 which is located within the region of those corners of plates 17 which define an angle of 40° is arranged on that side of the rotor arm 1 which is located opposite the bolts 13 and 16 while being spaced from said rotor arm 1. The common axial plane passing through the bolts 16 and 27 is provided in the starting position of the damping device 11 at a right angle with regard to the longitudinal direction of the rotor arm 1. The two bolts 16 and 27 are detachably connected to the plates 17. To this end, the bolts 16 have adjacent to their ends a circumferential groove 29 which corresponds to the thickness of the plate 17, whereas the plates 17 are provided with bores 28 corresponding to the outer diameter of the respective pertaining bolt. Bolts passed through the bores 28 can be arrested by radial movement in such a way that the marginal regions of the bores 28 positively engage the pertaining circumferential groove 29.

By means of bolt 16, the arm 12 is linked to the pertaining spring leaf 5 on the back side of arm 1 for pivoting in the direction indicated by the arrow 19. The end of spring leaf 5 is bent outwardly to form an eye 15 the inner mantle surface of which is rotatably engaged by the bolt 16 in a substantially play-free manner. It is also possible to place bolt 16 relative to spring leaf 5 in such a way that the bolt is stationary while the plates 17 are pivotable relative to the bolt 16.

Plates 17 have only a slight lateral distance from the leaf spring packet and therefore limit a lateral displacement of the spring leaves relative to each other. The spring leaves 5 to 7 engage each other in such a way that they can be slidingly displaced relative to each other in the longitudinal direction of the double arrow 19. In order to increase the sliding ability of the leaf springs relative to each other, intermediate layers or strips, for instance polyamide strips or thin hardened strips of spring steel 18, may be interposed between the individual spring leaves.

Journalled on bolt 27 of arm 12 is a spring yoke 21 which is designed symmetrically with regard to the axial plane of bolt 27 which plane in the starting position passes through the axis of bolt 16. The spring yoke 21 has its ends 22 rest on the outer surface 23 of leaf spring 7. The ends 22 of the spring yoke are at their engaging surface 24 convexly curved in such a way that they will be able with a certain friction to slide on the outer surface 23. In the middle between its ends 22, the spring yoke 21 has a bend 25 which in the side view of FIG. 2 is approximately semicircular and the concave side 26 of which that is open toward the outside faces away from the leaf spring packet. The spring yoke 21 is formed by a metal strip which as to its width corresponds to the spring leaves 5 to 7. The inner diameter of this bent portion 25 corresponds to the outer diameter of bolt 27 which is pivotally located in the bearing cup formed by the bent portion 25.

According to the illustrated embodiment of this invention, the spring yoke 21 is for purposes of obtaining a flat spring characteristic formed by two individual yokes arranged one upon the other of which, however, only one has engaging legs for engagement with the leaf spring 7. Also more than two individual yokes may be provided. The spring yoke 21 is thus pressed against the spring packet in such a way that its ends will under a preload rest against the leaf spring 7. As a result thereof, the spring leaves 5 to 7 will, when the damping device 11 is in its starting position, be pressed against each other at a constant spring pressure which determines the friction of the spring leaves with regard to each other and whereby the spring leaves will be prevented from lifting themselves off the intermediate layers 18. Moreover, the bolts 16, 27 are held in their arrested position by the spring force of the spring yoke 21.

Bolt 13 which is located somewhat farther away from the inner end 8 of the pertaining rotor arm than bolt 16, is when the damping device is in its starting position resting against the outer surface 14 of the spring leaf 6 which is adjacent to the spring leaf 5 in such a way that the support 12 is able from its starting position to pivot in one direction only, namely in the direction in which the bolt 13 acting as abutment moves away from the outer surface 14. When placing the rotor arm 1 under load against the rotary working direction indicated by the arrow 10 so as to move the said arm into its working position 1a shown in FIG. 1, the spring leaves 6, 7 which are located on the outside within the region of bolt 13 will move relative to each other in a direction opposite to the direction indicated by the arrows 19'' and 19' so that, in conformity with FIG. 1, a turning moment toward the right will act upon arm 12 which moment, however, in view of the fact that bolt 13 rests against the outer surface 14, will not bring about a pivoting movement of arm 12 so that the outer surface 23 of spring leaf 7 slides along the engaging ends 22 of the spring yoke 21. However, as soon as the rotor arm moves out of its working position 1a in the direction toward its relaxed position, the relative displacement movement between the two outer spring leaves 6, 7 is reversed so that a turning moment toward the left is exerted upon arm 12 by engagement of the spring yoke 21 in conformity with FIG. 2. This turning moment toward the left brings about a corresponding pivoting movement of arm 12 during which bolt 13 is lifted off the outer surface 14. At the same time, during this pivoting movement of bolt 27, the outer surface 23 of spring leaf 7 approaches in such a way that the pressing force of the spring yoke 21 on the spring leaf 7 increases and the spring leaves 5 to 7 are compressed to a correspondingly greater extent. As a result thereof, the friction between the spring leaves 5 to 7 becomes greater so that the relaxing movement of the rotor arm is dampened. With a correspondingly stronger relaxing movement, bolt 27 of the damping device 11 will approach the spring leaf 7 to such an extent that the bend 25 of the spring yoke 21 engages the outer surface 23 of spring leaf 7 whereby no longer any resilient clamping of the spring leaves 5 to 7 is effected. At the start of the relaxing movement, however, the damping device 11 rests resiliently against the spring leaves. The engaging ends 22 of the spring yoke 21 thus form a feeler member for the transfer of the damping device 11 to its damping position. By means of the damping action, the rotor arm 1 is prevented from moving into its turned-over position 1b shown in FIG. 1. In view of the described design, the arm 12 is pivotally journalled in the manner of a one-arm lever while the bolt 16 forms one clamping member and the spring yoke 21 forms the other clamping member and the feeler member. The arm 12 acts in the manner of an angle lever having one leg end provided with the connecting and abutment bolt 13.

Due to the described design, a complete relaxation of the spring arm from its loaded working position results in a strong damping of the relaxing movement, whereas a partial relaxation results in a weaker damping of the relaxing movement so that the damping effect can be precisely adapted to the respective relaxing movement.

According to the embodiment illustrated in FIGS. 4 and 5, the spring yoke 21b is formed by a wound torsion spring while one arm 31b of the spring yoke 21b designed in the manner of a two-arm lever is formed by the wire ends of the torsion spring and the other arm 32b is formed by a yoke-shaped bent section of the wire forming the torsion spring. The two arms 31b, 32b merge with each other along two aligned wound sections 33b while the legs 34b of the arm 32b are wound inwardly toward each other and then merge with the wire ends of the torsion spring which form the arm 31b. The wound sections 33b form a bearing opening 26b for journalling the spring yoke 21b on bolt 27b.

The cross section of the torsion spring wire is rectangular while in the wound sections 33b the longer cross-sectional edge is parallel to the winding axis. The cross web 30b of the yoke 32b which web forms the end of arm 32b has its cross section at an angle with regard to the plane of the spring leaf in such a way that a rounded edge 35 thereof rests along a line against leaf spring 7b. The ends 22b of arm 31b are at their engaging surface 24b curved convexly. The engaging surfaces 24b, 35b can with predetermined friction slide on the outer surface 23b of the leaf spring 7b.

The arrangement of FIGS. 4 and 5 uses the same reference numerals as they have been employed in connection with FIGS. 1 to 3 but with the additional character b.

According to the embodiment illustrated in FIGS. 6 and 7, the holding member 11a is formed by two flat bars 17a which may be made of flat iron and the ends of which are respectively provided with a hole 28a for receiving the bolt 16a, 27a respectively. In view of this design, the holding member 11a can pivot from its starting position according to FIG. 6 in two directions so that this damping device acts in a damping manner not only unilaterally, as is the case with the embodiment of FIGS. 4 and 5, but also in both directions. According to FIGS. 6 and 7, the spring yoke 21a is formed by a bent spring leaf. It is, however, also possible with the embodiment of FIGS. 6 and 7 to provide a wound torsion spring according to FIGS. 4 and 5. In FIGS. 6 and 7 the same reference numerals are employed as in FIGS. 4 and 5 but with the additional character a.

It is, of course, to be understood that the present invention is, by no means, limited to the particular showing in the drawings but also comprises any modifications within the scope of the appended claims.

What I claim is:

1. A scraping arm on a rotor in drum shape for removal of a bulk material column in silo discharging devices with a spring leaf packet the spring leaves of which slidably engage each other in longitudinal direction thereof, which includes holding means for holding said spring leaves together for removal of lower range of the bulk material column, the scraping arm being mounted tangentially on the rotor embodied in drum shape and being provided with a projecting part of the arm that upon strong loading can engage against the periphery of the rotor drum thereby being protected against overload and breakage, the improvement comprising in combination therewith: damping means engaging said rotor arm for damping the relaxing movement of said rotor arm in the direction in which said rotor arm rotates during its working operation particularly for damping the scraping arm during forward whip movement of the same as occurs upon sudden elimination of load resistance of the scraping arm in working rotating direction.

2. A rotor arm according to claim 1, in which said damping means is linked to said rotor arm, at least portions of said damping means being formed by said holding means.

3. A rotor arm according to claim 2, in which said damping means is carried by said rotor arm.

4. A rotor arm according to claim 1, in which said damping means is movable from its normal damping position into a position with a lesser damping effect.

5. A rotor arm according to claim 4, in which said damping means comprises feeler means responsive to the movement of said rotor arm and the relative longitudinal movement of said spring leaves with regard to each other for movement of said damping means into at least one of said damping positions.

6. A rotor arm according to claim 1, in which said damping means is a friction damping means and includes braking means for braking the relative longitudinal movement of said spring leaves.

7. A rotor arm according to claim 6, in which said braking means includes clamping means for compressing at least two spring leaves within the region of said clamping means.

8. A rotor arm according to claim 6, in which said braking means at least over a starting portion of its path of movement toward the damping position rests elastically against said spring leaves.

9. A rotor arm according to claim 8, which includes clamping spring means interposed between said braking means and said spring leaves for compressing said spring leaves.

10. A rotor according to claim 7, in which said clamping means is pivotally mounted for pivoting about an axis parallel to the spring leaf plane or about an axis which is perpendicular to the longitudinal direction of the spring leaves for pivotal movement between the damping position and the non-damping position.

11. A rotor arm according to claim 10, in which said clamping means is journalled in the manner of a one-arm lever, the pivot forming one clamping element being stationary relative to said rotor arm and formed by a bolt, that spring leaf which is adjacent to said bolt having an eye at the end thereof through which said bolt extends, said last mentioned spring leaf being located on the rear side of said rotor arm when viewing the latter in the working direction of said rotor arm, said clamping means resting on that side of said rotor arm which is located opposite said bolt.

12. A rotor arm according to claim 5, in which said feeler means is formed by at least one clamping element which frictionally engages a spring leaf and is substantially rigidly connected to said clamping means.

13. A rotor arm according to claim 12, in which said clamping element is spring-elastically supported and has associated therewith a non-elastically supported clamping element which relative to said clamping direction is set back.

14. A rotor arm according to claim 13, in which said non-elastically supported clamping element is symmetrically located between two supporting areas of the spring-elastically supported clamping element.

15. A rotor arm according to claim 14, in which the non-elastically supported clamping element is formed by the bolt-supported region of the spring-elastically supported clamping element.

16. A rotor arm according to claim 1, which includes abutment means for preventing said damping means from moving beyond its non-damping position, said abutment means having associated therewith the outer side of an outer spring leaf to form said abutment means.

17. A rotor arm according to claim 16, in which said damping means is journalled in the manner of an angle lever having one lever end provided with a clamping element and having its other lever end provided with a bolt forming an abutment.

18. A rotor arm according to claim 1, in which said damping means comprises a supporting member with two plates arranged opposite to each other, an abutment bolt interconnecting said plates and forming therewith a rigid structure, said damping means including two additional bolts detachably insertable into said plates.

19. A rotor arm according to claim 18, in which each of said plates has a substantially right-angled triangular configuration.

20. A rotor arm according to claim 9, in which said clamping spring means is formed by a wound torsion spring.

21. A rotor arm according to claim 9, in which said clamping spring means has a rectangular cross section.

22. A rotor arm according to claim 21, in which said clamping spring means has in its wound range the longer cross sectional edge arranged parallel to the winding axis of said clamping spring means.

23. A rotor arm according to claim 9, in which said clamping spring means forms a two-arm lever having one arm designed in the manner of a yoke and having its other arm formed by the freely extending ends of the clamping spring wire, the inner width of said yoke arm being greater than the outer spacing between the two wire ends of said clamping spring means.

24. A rotor arm according to claim 23, in which said yoke arm has a transverse web extending at an angle to the plane of said spring leaves.

25. A rotor arm according to claim 24, in which said clamping spring means comprises a bearing opening formed by at least a wound section of said clamping spring means for receiving a bolt.

26. A rotor arm according to claim 25, in which said clamping spring means comprises two wound sections arranged in spaced relationship to each other and forming the merging areas between the legs of said yoke and the ends of said clamping spring means.

27. A rotor arm according to claim 9, which includes holding means supporting said clamping spring means and linked to said leaf spring packet and pivotable from a starting position into both pivoting directions in the manner of a two-arm lever, said clamping spring means being mounted in the end region of said last mentioned lever.

28. A rotor arm according to claim 27, in which said holding means is pivotally linked to said leaf spring packet by means of a bolt, and in which said holding means is formed by two flat bars arranged laterally on said leaf spring packet while the ends of said bars are respectively provided with a bore for detachably receiving said last mentioned bolt.

* * * * *